INVENTORS
KARL WILFERT AND
BELA BARENYI

BY Dike and Craig

ATTORNEYS.

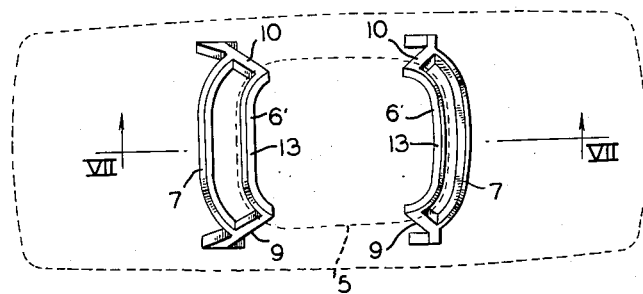
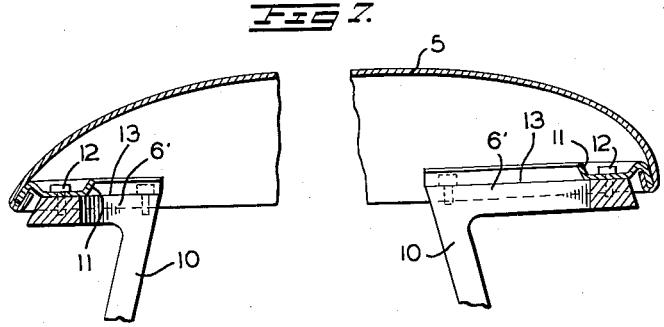

United States Patent Office 2,967,072
Patented Jan. 3, 1961

2,967,072
CAR STRUCTURE

Karl Wilfert, Stuttgart-Degerloch, and Béla Barényi, Stuttgart-Hohenheim, Germany, assignors to Daimler-Benz Aktiengesellschaft, Stuttgart - Unterturkheim, Germany Filed Apr. 10, 1956, Ser. No. 577,376

6 Claims. (Cl. 296—28)

The present invention relates to motor vehicles, and particularly passenger cars, of the sedan type which are provided with a closed top which is supported by yoke like bars which are supported by the chassis.

It is an object of the present invention to provide a supporting structure for the top of motor vehicles which is of great solidity so as to insure the safety of the car's passengers, and also allows a perfect view from the inside of the car in all directions.

Another object of the present invention is to provide a supporting structure for the top of a car which consists of yokelike bars which brace themselves of their own accord on the frame or bottom of the car, thereby with such bottom forming a very solid entity.

A further object of the present invention resides in further reinforcing the yokelike supporting bars by means of intermediate crossbars and in preferably shaping the yokelike bars and such crossbars so as to form an outwardly curving frame for supporting the windshield or rear window of the car.

According to the present invention, the top of the car is preferably designed so that its roof terminates evenly with the upper crossbar of the supporting yokes. The roof may then be detachably secured to the yokes so that in nice weather it may be easily disconnected and removed.

Still another object of the present invention is to provide the lower ends of the supporting yokes with inclined portions, and to make the chassis of the car of a troughlike shape with similarly inclined forward and rear ends. The inclined lower ends of the supporting yokes will then rest upon the corresponding inclined surfaces of the chassis and thereby brace themselves thereon. The inclined portions of the yokes and the chassis may then be secured to each other either permanently or detachably.

Further objects, features, and advantages of the present invention will appear from the following detailed description thereof, as well as from the accompanying drawings, in which Fig. 1 shows diagrammatically a front view of an automobile provided with the supporting yokes according to the invention;

Fig. 6 shows a plan view of Figure 5; while

Fig. 7 is an enlarged cross-sectional view of Figure 6 taken on line VII—VII and showing detachable connecting means between the roof and the yokes.

Figure 1:
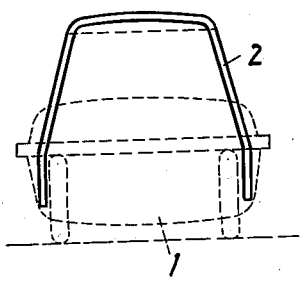

Referring to the drawings, a passenger car 1 of any suitable design is provided with a top which is supported at the front by a yokelike bar 2 and at the rear by another yokelike bar 3. Both yokes may be supported, for example, by the self-supporting, troughlike bottom 4 of the central part of the car. For this purpose, the lower ends of yokes 2 and 3 are provided with inwardly inclined portions 2', for example, by making the yoke of greater width toward the upper end of the inclined portion 2', as shown at the front yoke 2, or by bending the lower end toward the center of the car as shown at 3' on the rear yoke 3. The connection between the yokes 2 and 3 and the bottom 4 may be either detachable, for example, by means of bolts connecting the portions 2' and 3' with the corresponding outwardly inclined arms or walls of the bottom 4, or by being permanently secured to each other at such portions, for example, by being welded together. The yokelike bars 2 and 3 may be made, for example, of sheet metal or of structural steel or the like of suitable cross-sectional shape so as to have the greatest possible bending and compressive strength.

Figure 2:
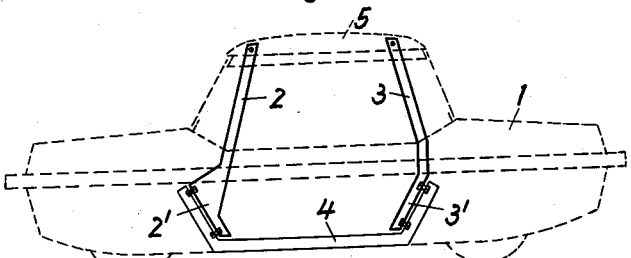
Fig. 2 shows a side view thereof.
Figure 3:
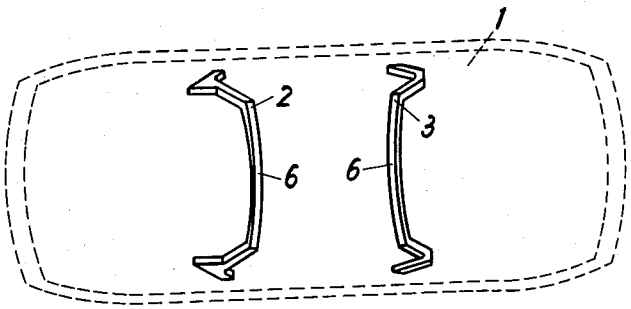
Fig. 3 shows a top view thereof.
Figure 4:
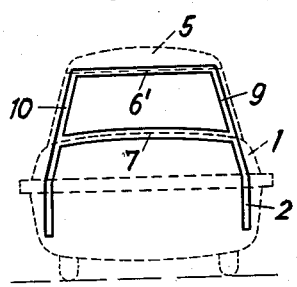
Fig. 4 shows a front view of a modification of the invention in which the supporting yokes are provided with additional transverse supports.
Figure 5:
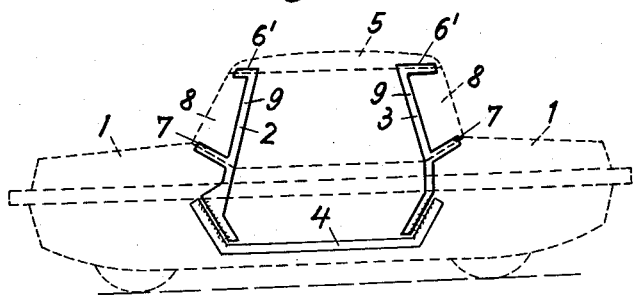
Fig. 5 shows a side view of the embodiment according to Fig. 4.

In the embodiment of the invention as shown in Figs. 1 to 3, the upper end or central part 6 of yokes 2 and 3 abuts against the inner surface of the roof 5 of the car top and conforms to the shape thereof. In the embodiments as shown in Figs. 4 and 5, however, the side arms of each of the yokes 2 and 3 are connected with each other by two cross bars 6' and 7, wherein the upper bar 6' takes the place of the upper central part 6 of yokes 2 and 3 according to Figs. 1 to 3. Crossbars 6' and 7 are curved toward the front and serve together with the upper parts 9 and 10 of the side arms as frames for supporting the windshield and rear window 8 of the car top. These frames are preferably made of the same size and curvature which will facilitate the manufacture thereof as well as of the windows themselves. In the embodiment as shown in Figs. 4 and 5, the front and rear ends of roof 5 rests upon the upper crossbar 6'. As shown in Figures 6 and 7 the crossbars 6' are provided with upper fastening surfaces 13 disposed in a common horizontal plane for receiving these ends, which as shown in Figures 5 and 6 are curved to correspond with the curvatures of the crossbars 6'. In both embodiments, that is, in the one shown in Figs. 1 to 3 and the other shown in Figs. 4 and 5, roof 5 may be secured to the two yokelike bars 2 and 3 either permanently or so as to be easily detachable therefrom, for example, by bolts, so that in nice weather it can be quickly removed. An example of this detachable construction is shown in Figure 7 wherein the roof 5 is provided at each end with an inwardly extending strip fastening member 11 secured to cross bars 6' in a readily detachable manner by bolts 12. The yokelike bars 2 and 3, and particularly those shown in Figs. 4 and 5, may also form an essential structural unit of the car body. The inclined lower ends of the bars 2 and 3 and the corresponding surfaces of the bottom 4 may, as shown in Fig. 5, also be serrated so as to improve their engagement with each other.

Although our invention has been illustrated and described with reference to the preferred embodiments thereof, we wish to have it understood that it is in no way limited to the details of such embodiments or to the specific examples described, but is capable of numerous modifications within the scope of the appended claims.

Having thus fully disclosed our invention, what we claim is:

1. A motor vehicle comprising a chassis, a passenger compartment roof support consisting of two yokelike bars extending transversely to the longitudinal axis of said vehicle, each of said yoke-like bars having an upper crossbar, an intermediate crossbar, and upwardly directed side bars connecting said crossbars and secured to said chassis at the lower portions thereof, said two crossbars of each yoke being curved outwardly toward the front and rear of said vehicle away from each other and forming a frame with the upper parts of said side bars, the said outwardly curved upper crossbars of the said two yoke-like bars being disposed in a common horizontal plane, a window within each said frame, a substantially closed roof-like upper body having a front portion and a rear portion, each of the said outwardly curved upper crossbars comprising a similarly curved fastening surface, fastening means carried by said front portion and said rear portion for contacting each said fastening surface, and detachable means engaging said fastening means and said outwardly curved upper crossbars and securing said fastening means on said fastening surface of each of said upper crossbars.

2. A motor vehicle comprising a chassis, a passenger compartment support structure consisting of two yoke-like bars extending transversely to the longitudinal axis of said vehicle, each of said yoke-like bars having an upper crossbar, an intermediate crossbar, and a pair of upwardly directed side bars connecting said crossbars and secured to said chassis, said two crossbars of each yoke being curved outwardly toward the front and rear of said vehicle away from each other and forming a frame with the upper parts of said side bars, a window in each said frame, the said upper crossbars of the said two yoke-like bars being disposed in the same horizontal plane, the underside of each of said upper crossbars contacting the upper edge of one said window, the upper side of each of upper crossbars being formed as a fastening surface, a roof provided at each end thereof with a fastening member contacting one said fastening surface, and detachable means engaging each said fastening member and one of said upper crossbars for securing one said fastening member to one of said upper crossbars.

3. A vehicle body including a vehicle frame with a trough-like floor having upwardly and outwardly inclined front and rear end parts, two yoke-like bars extending transversely to the longitudinal axis of said vehicle, each of said bars including a pair of side arms and an upper transversely disposed crossbar which connects said side arms, the lower ends of said side arms being inclined with respect to the center of said vehicle so as to correspond to said inclined end parts of said floor and to rest thereon, and means for securing said inclined end parts of each of said side arms to said upwardly and outwardly inclined front and rear end parts of said vehicle frame floor.

4. A vehicle body including a vehicle frame with a trough-like floor having upwardly and outwardly inclined front and rear end parts, two yoke-like bars extending transversely to the longitudinal axis of said vehicle, each of said bars including a pair of side arms, an intermediate outwardly curved crossbar and an upper transversely disposed and outwardly curved crossbar connecting said side arms, said crossbars, and the upper portions of said side arms defining a window space, the lower ends of said side arms being inclined with respect to the center of said vehicle so as to correspond to said inclined end parts of said floor and to rest thereon, means for securing said inclined end parts of each of said side arms to said upwardly and outwardly inclined front and rear end parts of said vehicle frame floor, and a roof removably secured to said upper transversely disposed and outwardly curved crossbar of each of said two yoke-like bars.

5. In a motor vehicle having a chassis and passenger compartment, means comprising two yoke-like bars each including upwardly extending side bars, each of said yoke-like bars having an upper crossbar and a lower crossbar, said crossbars defining the forward and rear ends of said passenger compartment, each of said crossbars of one of said two yoke-like bars extending in a curvature outwardly toward the rear of the vehicle, each of said crossbars of the other of said two yoke-like bars extending in a curvature toward the front of said vehicle, front and rear windows for said passenger compartment, each of said windows being framed by said side bars and said upper crossbar and said lower crossbar of one of said two yoke-like members, the said upper crossbars of said yoke-like members having upper surfaces disposed in a common horizontal plane, a roof member having front and rear end portions terminating respectively adjacent said upper crossbars, and means including detachable means for supporting said roof member on said upper surfaces.

6. In a motor vehicle, the combination according to claim 5, wherein said front end portion of said roof member has a curvature corresponding to the said curvature of the said upper crossbar of the said one of said yoke-like members, the said rear end portion of said roof member having a curvature corresponding to the said curvature of the said upper crossbar of the said other of said yoke-like members.

References Cited in the file of this patent

UNITED STATES PATENTS

| | | |
|---|---|---|
| 2,028,184 | Bergholt | Jan. 21, 1936 |
| 2,157,649 | Eksergian | May 9, 1939 |
| 2,383,611 | Marcy | Aug. 28, 1945 |
| 2,389,907 | Helmuth | Nov. 27, 1945 |
| 2,612,964 | Hobbs | Oct. 7, 1952 |
| 2,669,462 | Toncray et al. | Feb. 16, 1954 |
| 2,677,572 | Pickard | May 4, 1954 |

FOREIGN PATENTS

| | | |
|---|---|---|
| 828,485 | Germany | Jan. 17, 1952 |
| 256,674 | Italy | Jan. 11, 1928 |